United States Patent [19]

Snell et al.

[11] Patent Number: 4,622,681

[45] Date of Patent: Nov. 11, 1986

[54] APPARATUS FOR TRANSMITTING DIGITAL DATA

[75] Inventors: Stephen C. Snell, Watsonville; Thomas P. Scarinci, Aptos, both of Calif.

[73] Assignee: Empath Communications, Inc., Aptos, Calif.

[21] Appl. No.: 604,065

[22] Filed: Apr. 26, 1984

[51] Int. Cl.$^4$ .......................... H04B 9/00; H04L 22/10
[52] U.S. Cl. ...................................... 375/48; 250/551; 455/602; 455/608
[58] Field of Search ........................ 455/602, 612, 608; 329/122; 331/DIG. 2; 375/48, 44, 45; 250/551

[56] References Cited

U.S. PATENT DOCUMENTS

| 3,903,497 | 9/1975 | Stimler et al. | 455/612 |
| 4,034,310 | 7/1977 | Coe | 331/DIG. 2 |
| 4,149,186 | 4/1979 | Chung et al. | 250/551 |
| 4,313,227 | 1/1982 | Eder | 455/617 |
| 4,471,355 | 9/1984 | Hardy et al. | 455/612 |
| 4,506,233 | 3/1985 | Englund, Jr. | 331/DIG. 2 |

Primary Examiner—Joseph A. Orsino, Jr.
Attorney, Agent, or Firm—Knobbe, Martens, Olson & Bear

[57] ABSTRACT

An apparatus is disclosed for transmitting digital data by radio frequency electromagnetic radiation, wherein the radio frequency transmitter of the digital data is electrically isolated from the source of the digital data. The radio frequency transmission is accomplished by symmetrical frequency modulation of a high frequency carrier, wherein the range of the symmetrical frequency modulation is responsive to the logical level of the digital data.

6 Claims, 16 Drawing Figures

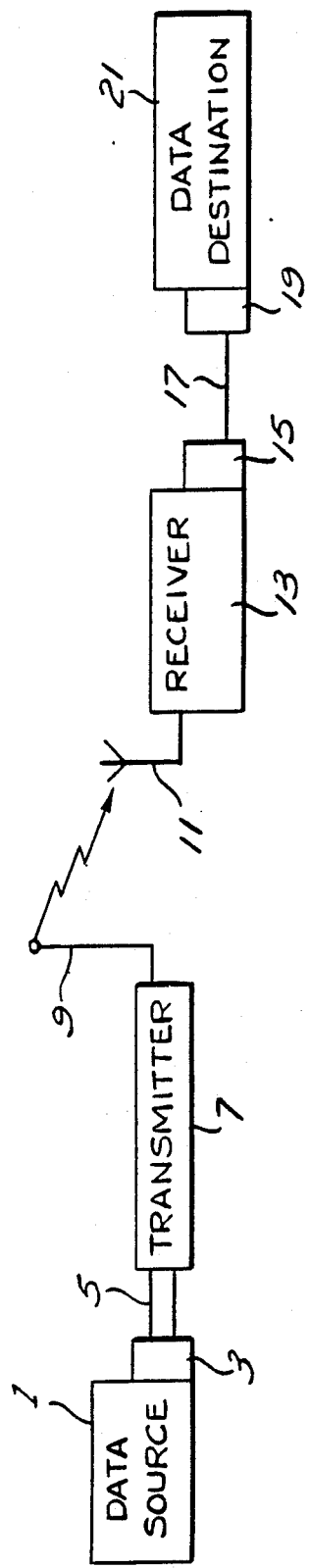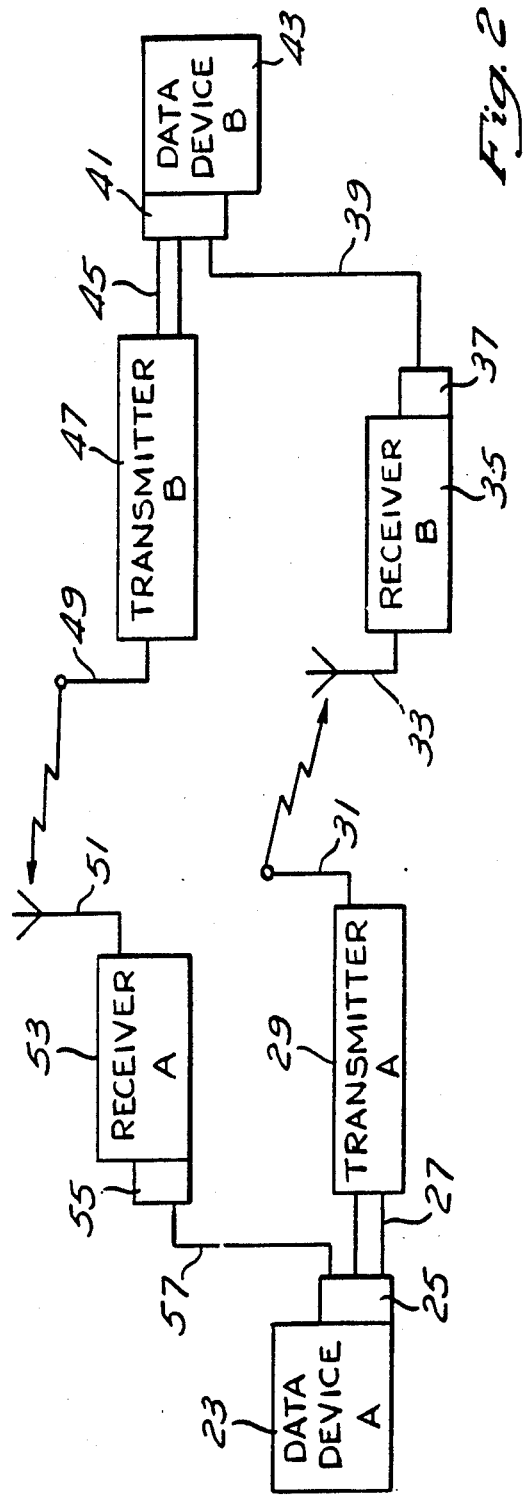

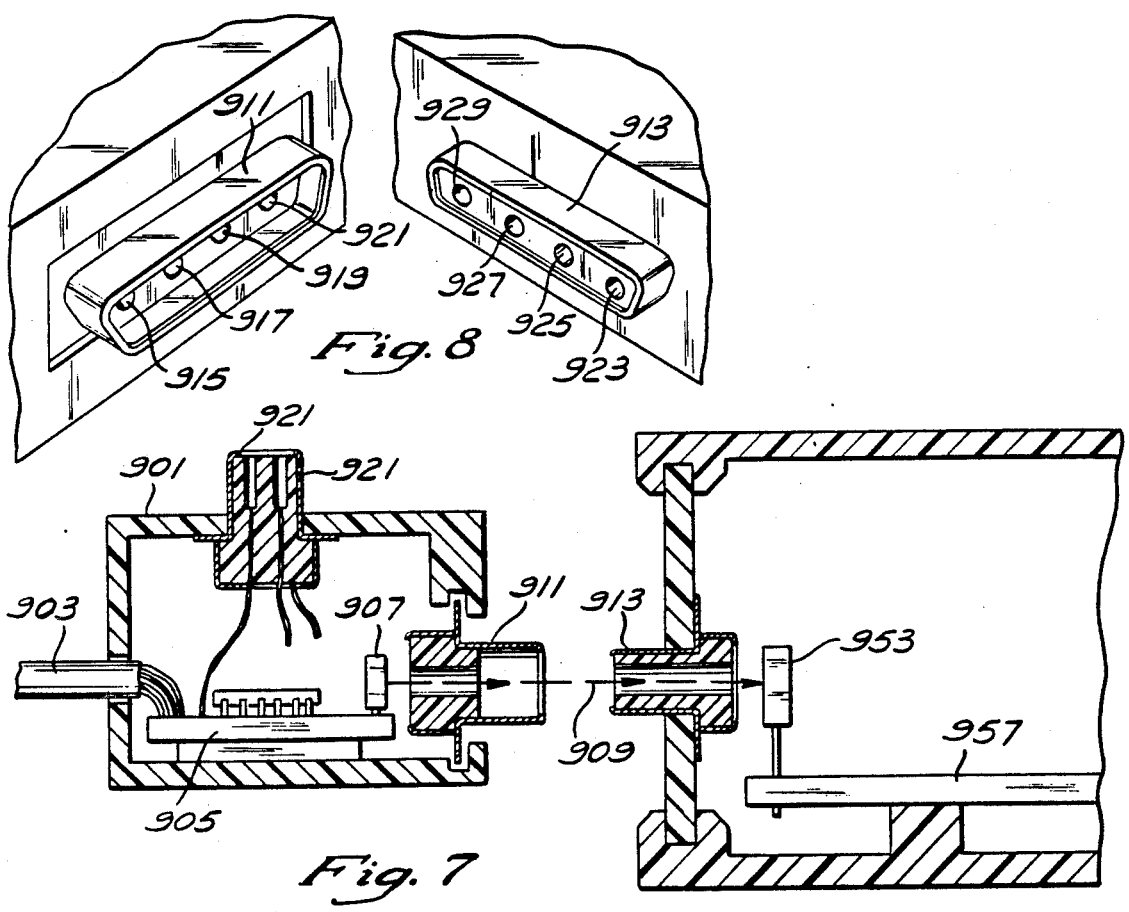

APPARATUS FOR TRANSMITTING DIGITAL DATA

FIELD OF THE INVENTION

The invention relates to the field of data communications, and, more particularly, to the transmission of digital data by radio frequency communications.

BACKGROUND OF THE INVENTION

In recent years, there have been rapid expansions of the fields of digital computers and robotics in the consumer markets. The proliferation of such devices has resulted in an increased need for means for communicating digital data between multiple devices. For instance, digital computers require input and output devices from which and to which digital data is transferred. Robots, which perform complex acts which emulate certain human functions, are typically controlled by a remote computer or receive program information from a remote computer.

In any case, the transfer of digital information between devices is generally accomplished by connecting devices with one or more electrically conducting wires. This requirement that the devices be electrically connected significantly reduces the portability or transportability of the devices, since the data communications wiring must remain connected. For instance, although a computer may be constructed which is portable, generally a printer is not readily relocatable. Thus, although the computer could be moved from room-to-room, such moves would be limited by the ability to maintain the wired interconnection between the computer and the printer.

Although means are available for interconnecting remote devices, such as using a modem with a standard telephone system, such means are not practical when the remote devices are located within the same general area. Furthermore, devices connected by modems are not truly portable since they must be electrically connected to the telephone network.

One possible solution to obtaining data communications between devices without requiring the devices to be electrically connected is the use of radio communications. However, one cannot simply interconnect two digital devices with a radio transmitter and receiver and initiate communications between the devices. Radio frequency communications within the United States are heavily regulated and restricted as to use. Very few channel frequencies are available for the type of communication described above. Furthermore, those frequencies which are available are restricted to a limited number of licensed users. The burden and expense of obtaining a license and equipment to operate on a typical frequency band allocated to digital data communications makes such operation impractical for the casual user.

The Federal Communications Commission has recently made a new frequency band available for low power communications. A low power communication device may be operated on one or more of the frequencies 49.830 MHz, 49.845 MHz, 49.860 MHz, 49.875 MHz or 49.890 MHz, without any restriction on the type of modulation; however, the device is restricted to a self-contained unit according to 47 C.F.R. § 15.117-15.119. In other words, the device cannot be electrically connected to an external device, such as a computer. The principal reason behind this particular rule is apparently to avoid any spurious radio transmissions which might occur on any electrical wires connected to the transmitting device. Furthermore, the limitation prevents a user from placing the transmitter at a high elevation and connecting it to a remote data source, thus, increasing the communications range. Typical utilization of the frequencies are for remote control toys and for cordless telephones.

The typical range of such a transmitting device of approximately 300–700 feet is well-suited to communications between digital devices in a typical office or residential area. The frequencies listed would be ideal for transmitting digital data communications between a computer and a peripheral device or between a computer and a mobile robot; however, the restriction of no electrical connection between the transmitting unit and another device makes such frequencies unavailable using conventional interconnection means.

As set forth above, a need exists for a device which allows communications between digital devices on the unlicensed frequency range of 49.82 to 49.90 MHz. However, since electrical interconnections are prohibited by Federal Communication Commission's regulations, such need cannot be fulfilled by ordinary interconnection means.

SUMMARY OF THE INVENTION

An apparatus is disclosed which comprises a high frequency radio transmitter operating at one or more of the frequencies 49.830 MHz, 49.845 MHz, 49.860 MHz, 49.875 MHz and 49.890 MHz. The transmitter has a single element antenna having a length of less than one meter, and which is permanently mounted to the enclosure containing the transmitter circuitry. The device can optionally be operated from an internal battery or from public utility lines.

The signal transmitted at one of the selected frequencies is modulated by a digital data signal which is communicated to the transmitter circuitry by means of electrically isolated modulated light signals. The light signals are generated by light emitting diodes electrically connected to the output of a digital computer or other digital data generated device. The light signals are received by phototransistors or other light-sensitive components located within the enclosure containing the transmitter circuitry. The output of the phototransistors or other light-sensitive components are conditioned to control the modulation of the transmitter circuitry responsive to the digital output of the digital data generating device.

The apparatus described hereinafter meets the requirements of the Federal Communications Commission's regulations in that there is no electrical connection between the transmitter circuitry and an external device.

BRIEF DESCRIPTION OF THE DRAWINGS

FIG. 1 is a block diagram of a system which includes the present invention to provide wireless digital communication between two devices.

FIG. 2 is a block diagram of a system which includes the present invention to provide two-way wireless digital communication.

FIG. 7 is a partial cross sectional view of the invention, showing the positions of some of the principal components.

FIG. 8 is a perspective view of the connectors which optically interconnect the transmitter with the interface adapter.

DETAILED DESCRIPTION OF THE DRAWINGS

Figure 3:
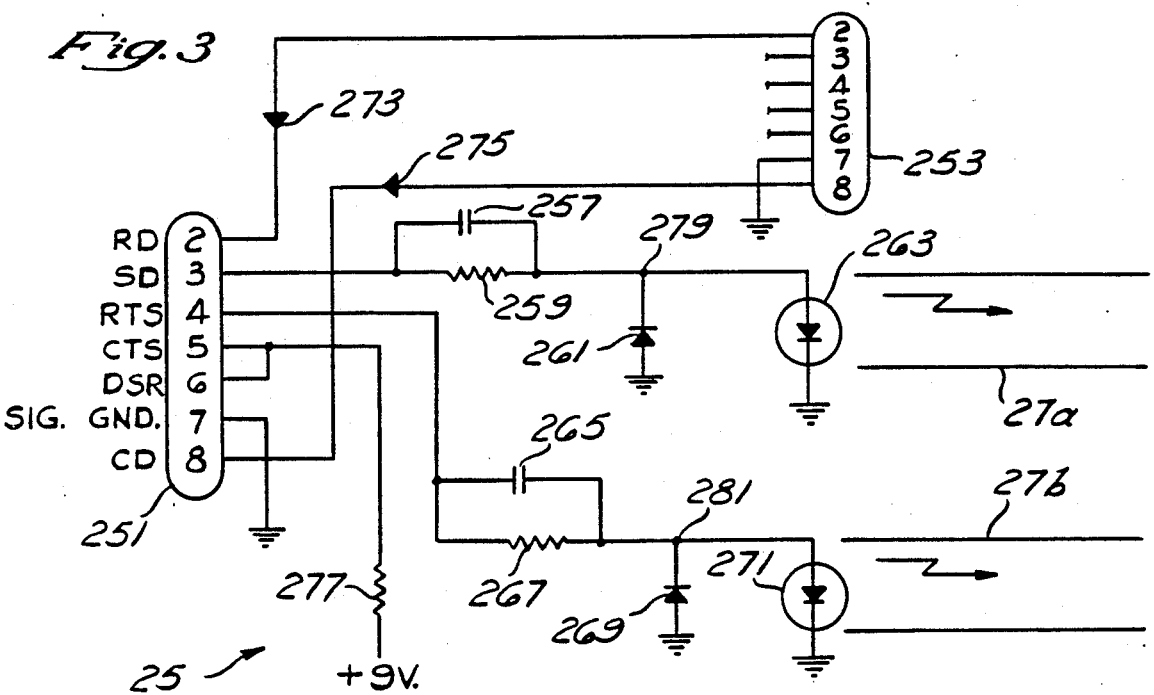
FIG. 3 is a schematic diagram of the RS-232C to infrared light adapter circuit.

FIG. 1 is a block diagram of a typical system incorporating the invention described herein. The data source 1 is typically a digital computer or other device capable of generating a serial stream of digital information. Typically, this information will be transmitted in compliance with the Electronic Industry's Association (EIA) standard RS-232C specification. In general, a significant portion of digital computers and peripheral devices can be obtained with an interface compatible with the RS-232C specification. Typically, the data is communicated asynchronously and uses start bits and stop bits to delineate the beginning and end of each data character sent. The EIA RS-232C specification and asynchronous communication protocol are well known to the art and will be briefly described below in connection with the construction of the invention.

Interface adapter 3 is connected to the RS-232C output of the data source. As will be described in detail below, the interface adapter 3 responds to one or more of the RS-232C compatible voltage outputs of the data source 1 by selectively activating infrared light sources.

The infrared light signals from the infrared light sources in interface adapter 3 are communicated to transmitter 7 via optical light path 5. As will be described below, optical light path 5 can be a direct physical, but not electrical, connection between the interface adapter 3 and the transmitter 7. Typically, the optical path 5 will be comprised of optical tubes which allow the light signals from the interface adapter 3 to be guided to transmitter 7 without interference from extraneous light sources. As will be explained, below, the light tubes can be formed from readily available connector shells.

Transmitter 7 is a low power, frequency modulated transmitter which operates on one or more of the frequencies 49.830 MHz, 49.845 MHz, 49.860 MHz, 49.875 MHz, and 49.890 MHz. The selected frequency is modulated by one of the light signals from interface adapter 3 via optical light path 5. The transmitter responds to said modulation by transmitting a signal which has a frequency which is higher or lower than the selected base frequency.

The output of transmitter 7 is transmitted on antenna 9 which is physically and electrically attached to transmitter 7.

The signal transmitted by transmitter 7 is received by receiver 13 through antenna 11. Receiver 13 is a conventional receiver responsive to frequency modulated signals on one or more of the previously described frequencies (i.e., 49.830 MHz, 49.845 MHz, 49.860 MHz, 49.875 MHz, and 49.890 MHz). Receiver 13 responds to the frequency modulated signal by demodulating said signal and providing output signals on connector 15, which output signals are substantially the same as the output signals from data source 1, and the signals are typically compatible with the EIA RS-232C standard. The receiver 13 is constructed in a conventional manner and does not form a part of the invention described herein.

The output of receiver 13 on connector 15 is electrically connectable to a data destination device 21 via connector 15, cable 17, and connector 19, a conventional RS-232C interconnection means. Thus, in a typical application, data destination device 21 is a printer or other peripheral device. In other applications, data destination device 21 can be a robot which receives program or control information from data source 1. As illustrated in FIG. 1 data destination device 21 is not electrically connected to data source 1. The invention herein, in combination with a conventional receiver, provides a radio frequency data link which replaces the standard interconnection cable. Therefore, either device can be freely movable, within the range of the transmitter 7, without having to relocate an interconnection cable.

FIG. 2 illustrates a typical two-way data communications system in which two of the inventions described herein have been incorporated. Data is transferred from data device A 23 through first adapter 25, first optical path 27, first transmitter 29 and first transmitter antenna 31 and then through first receiving antenna 33, first receiver 35, connector 37, interconnection cable 39 and second adapter 41, to data device B 43, as in the manner described above. In this embodiment, data device B 43 is capable of generating data as well as receiving it. Data device B 43 could be a printer which acknowledges receipt of data, a robot which signals completion of a task, or a device similar to data device A 23 (e.g., a second computer or terminal). Data devices A 23 and B 43 could be any devices which send and receive information on serial data streams. First and second adapters 25 and 41 are similar to adapter 3 in FIG. 1. However, in addition to the light signal generating devices connected to the output of the RS-232C connector, the adapters 25 and 41 have means for receiving electrical signals from the outputs of receiving devices 53 and 35 via cables 57 and 71, respectively, and conducting them to the input pins of the RS-232C connectors on the associated devices A 25 and B 43.

As shown, data device A 23 transmits data through first adapter 25 to first transmitter A 29. It receives data from second receiver 53 through connector 55 and cable 57 to first adapter 25. Similarly, data device B 43 receives data from first receiver 35 through connector 37, cable 39 and second adapter 41 and transmits data through second adapter 41 to second transmitter 45 via second optical path 45.

FIG. 3 illustrates the details of a preferred embodiment of the adapters 25 and 41 shown in FIG. 2. Adapter 3 of FIG. 1 is also similar except that receiver connector 253 described below is not used in FIG. 1. The following description is related to adapter 25, but is applicable to adapters 3 and 41. Although shown physically adjacent to their respective data sources in FIGS. 1 and 2, the adapters 3, 25 and 41 could be connected by suitable cables.

Connector 251 is typically a 25 pin "D"-type connector having the pins connected according to the RS- 232C standard. For the application described herein, only pins 2, 3, 4, 5, 6, 7, and 8 are connected. Pin 2 is the receive data connection to the data device 23 (shown in FIG. 2). Pin 2 of connector 251 is electrically connected to pin 2 of connector 253 which is connected to interconnection cable 57 (shown in FIG. 2) by a mating connector (not shown). The data on this line is transmitted in the direction shown by reference arrow 273, (i.e., from receiver 53 to data device A 23). Similarly, pin 8 of connector 251 is connected to pin 8 of connector 253. The signal on the line interconnecting the two connectors is the carrier detect signal which would be generated by second receiver 53 (shown in FIG. 2).

Pins 5 and 6 of connector 251 are the "clear to send" and "data set ready" signals which are typically required by data device A 23 (FIG. 2) for normal operation. These two signals are maintained in their active state by a high level voltage signal from resistor 277 which is connected to a 9-volt power source (typically a battery).

Pin 7 of connector 251 and pin 7 of connector 253 are signal ground references.

Pin 3 of connector 251 is the send data signal from data device A 23 (shown in FIG. 2). Pin 3 is electrically connected to infrared light emitting diode 263 through resistor 259 and capacitor 257. Infrared light emitting diode 263 is typically an MLED71, manufactured by Motorola Semiconductor, or the like. Resistor 259 limits the amount of current which flows through infrared light emitting diode 263 when the signal on pin 3 is at its highest voltage level. Capacitor 257 is a speed-up capacitor which compensates for the initially slow rise time of the voltage across infrared light emitting diode 263 caused by any forward capacitance of the infrared light emitting diode 263.

Diode 261 is a reverse polarity protection diode. If the signal on pin 3 of connector 251 tries to go more than one volt below the ground reference level, diode 261 will prevent the voltage at node 279 from going more than one volt below ground. Thus, infrared light emitting diode 263 will be protected from an excessive reverse voltage.

The RS-232C signals on connector 251 are typically represented by two voltage levels. A negative signal in the range of $-3$ volts to $-15$ volts represents a logical "one" state. A positive voltage in the range of $+3$ volts to $+15$ volts represents a logical "zero" state. A voltage in the range of $-3$ volts to $+3$ volts is not defined in the RS-232C standard.

The infrared light emitting diode 263 responds to a positive voltage signal level (i.e., $+3$ volts to $+15$ volts) on pin 3 of connector 251 by emitting a light signal in the infrared spectral range. The light signal emitted by infrared light emitting diode 263 travels along optical guide 27a in FIG. 3, corresponding to part of optical path 27 of FIG. 2. When the signal on pin 3 of connector 251 is at its negative voltage level, (i.e., $-3$ volts to $-15$ volts), the voltage level at node 279 will be clamped to a $-1$ volt, which is not harmful to infrared light-emitting diode 263. Infrared light emitting diode 263 does not emit light unless the voltage on node 279 is greater than its forward voltage. Thus, when the signal on pin 3 of connector 251 is negative, infrared light emitting diode 263 does not emit light. Thus, the two voltage levels (i.e., greater than $+3$ volts or less than $-3$ volts) on pin 3 of connector 251 can be detected as the presence and absence, respectively, of light from light emitting diode 263. As set forth above, a negative voltage level on pin 3 of connector 251 represents a logical "one" data bit according to the RS-232C standard. Thus, a logical "one" data bit is represented by the absence of emitted light from light-emitting diode 263, whereas a logical "zero" is represented by emitted light.

The request-to-send signal from pin 4 of connector 251 is connected through capacitor 265 and resistor 267 to mode 281 which is connected to infrared light emitting diode 271 and reverse polarity protection diode 269. The operation of the circuit connected to pin 4 of connector 251 operates in the same manner as previously described for the send data circuit. Typically, the data device connected to connector 251 (e.g., data device A 23 of FIG. 2) will activate the request-to-send circuit prior to transmitting data on the send data line (pin 3 of connector 251). An active request-to-send line is typically represented by a positive voltage on pin 4 of connector 251 and therefore by the emission of light from infrared light-emitting diode 271. As will be seen below, the transmitter circuit will respond to the active request-to-send signal by generating the carrier frequency. This carrier frequency can be detected by a receiving device (e.g., receiver B 35 of FIG. 2), and can indicate to the receiving device that it should prepare to receive digital data. Typically, the receiving device will activate the carrier detect line which corresponds to pin 8 of connectors 251 and 253. The operation of the receiver and its activation of the carrier detect line are well known to the art and do not form a part of the invention herein.

The infrared light output of infrared light emitting diode 271 is typically guided to the transmitter device through a second optical guide 27b, illustrated in FIG. 3.

Figure 4:
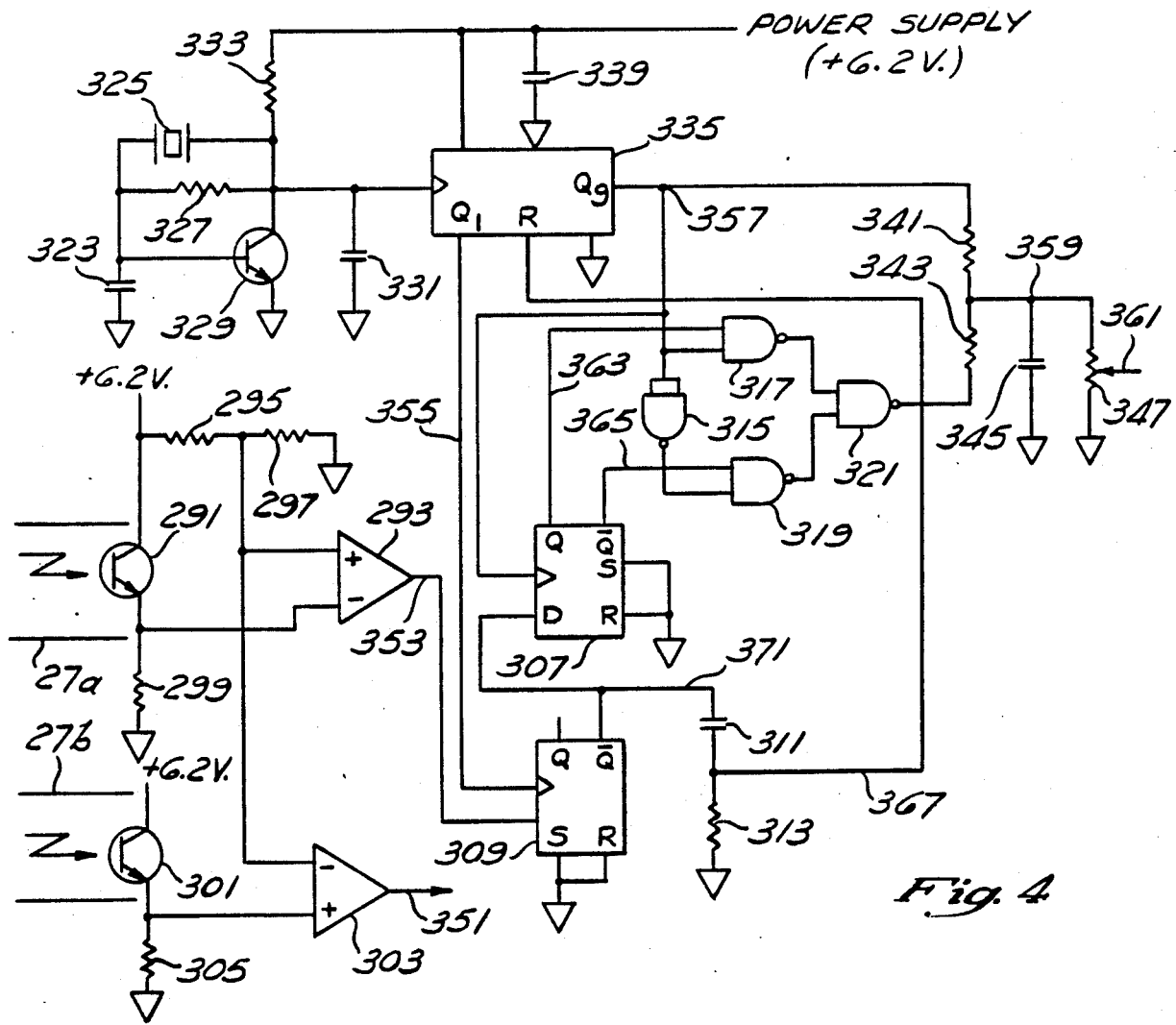
FIG. 4 is a schematic diagram of the infrared light receivers, signal synchronization circuit, and waveform generator.

FIG. 4 illustrates the light detecting and modulation waveform generating portion of the transmitter 29 previously shown in FIG. 2. Photodetector 301 is sensitive to light in the infrared spectrum as generated by the infrared light emitting diode 271. When light of appropriate wavelength and sufficient intensity impinges upon photodetector 301, it is caused to conduct in a conventional manner. Typically, the photodetector 301 is a Motorola Semiconductor MRD701, or the like. The collector of photodetector 301 is connected to a power supply voltage which is typically 6.2 volts in the example presented and is provided by a battery or other type of power supply. When photodetector 301 begins conducting, current flows through resistor 305 and generates a voltage which is electrically conducted to the positive input of comparator 303.

Typically, comparator 303 is one-fourth of a quad operational amplifier such as an MC3303P, manufactured by Motorola Semiconductor, or the like. The negative input of comparator 303 is connected to a voltage divider circuit comprising resistor 295 connected to the 6.2 volt power supply and resistor 297 connected to ground. The common connection of resistor 295 and 297 has a substantially constant reference voltage of approximately 0.4 volts. When the voltage across resistor 305 exceeds 0.4 volts (i.e., photodetector 301 is conducting), the output of comparator 303 on line 351 will be a positive voltage. When photodetector 301 is not conducting, no current flows through resistor 305, and the voltage on the positive input of comparator 303 is approximately zero volts. Therefore, the negative input of comparator 303 is higher than the positive input of comparator 303, and therefore, the output of comparator 303 on line 351 is approximately zero volts. Thus, line 351 will be at a high voltage level when light impinges upon photodetector 301 and will be at a low voltage level when there is no light on photodetector 301. Photodetector 301 is typically at the end of the light conducting tube 27b. The other end of the light conducting tube is infrared light emitting diode 271 (illustrated in FIG. 3) which responds to the request-to-send signal on pin 4 of connector 251 in FIG. 3. Thus, line 351 will be responsive to the request-to-send line. Referring back to the description of FIG. 3, a positive voltage (i.e., +3 volts to +15 volts) on pin 4 connector 251 will result in a high voltage level (approximately +6.2 volts) on the output of comparator 303. Similarly, a negative voltage (i.e., −3 volts to −15 volts) on pin 4 of connector 251 will result in a low voltage level (approximately 0 volts) on the output of comparator 303.

Photodetector 291, resistor 299, and comparator 293 operate in the same manner as previously described for photodetector 301 (resistor 305 and comparator 303). The output of comparator 293 on line 353 will be responsive to light impinging on photodetector 291, as described above. However, the connections to the positive and negative inputs of comparator 293 are reversed with respect to the photodetector 291 and the reference voltage. Therefore, the line 353 will be low (approximately 0 volts) when light impinges upon photodetector 291 and will be high (approximately +6.2 volts) when there is no light impinging on photodetector 291. Since photodetector 291 is responsive to the send data signal on pin 3 of connector 251 in FIG. 3 through infrated light emitting diode 263 of FIG. 3, line 353 will be at a high voltage level (i.e., approximately 6.2 volts) when the send data line on pin 3 of connector 251 is low and will be at a low voltage level (i.e., approximately 0 volts) when the send data signal is high. Thus, a logical "one" on pin 3 of connector 251, represented by a negative voltage (i.e., −3 volts to −15 volts will be a logical "one" represented by a high voltage (i.e., approximately 6.2 volts) on the output of comparator 293 on line 353; and a logical "zero" in pin 3 of connector 251, represented by a positive voltage (i.e., b +3 volts to +15 volts), will be a logical "zero" represented by a low voltage (i.e., approximately 0 volts) on the output of comparator 293 on line 353.

Ceramic resonator 325, resistor 327, capacitor 323, transistor 329, capacitor 331, and resistor 333 comprise a clock oscillator which generates a clock signal at 614.4 kHz. Integrated circuit 335 is a 12-stage binary counter with its clock input connected to the 614.4 kHz clock signal. The first stage output on line 355 will be 307.2 kHz. The ninth state output on line 357 will be 1200 Hz (i.e. 614.4 kHz/512). Typically, the 12-stage binary counter 335 will be a CMOS (complementary metal oxide semiconductor) circuit such as an RCA CD4040, or the like.

Figure 5:
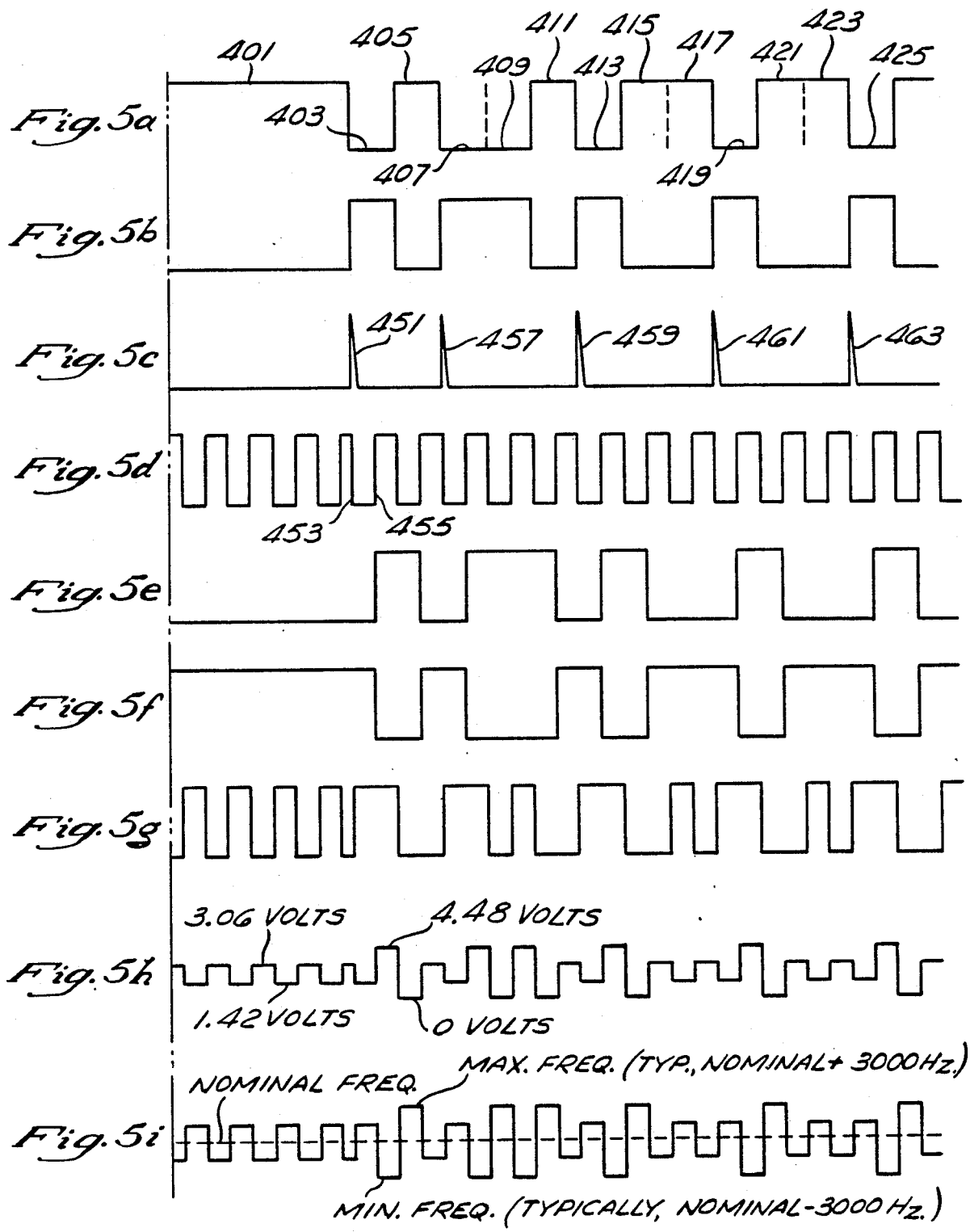
FIGS. 5a–5i are timing diagrams which show the relationship between the data signals in the synchronization circuit and the waveform generator in the invention.

A typical signal on line 353 is illustrated in FIG. 5a. Portion 401 of the signal in FIG. 5a is exemplary of the signal between data characters. The signal between data characters is typically a logical "one"; however, it contains no information. The first portion of the signal at the beginning of a character is a logical "zero" which is designated as the start bit 403. Thus, the beginning of each character can be distinguished from the signal between characters by the transition of the start bit from a logical "one" to a logical "zero".

Typically, the start bit 403 of a character is followed by eight data characters designated 405, 407, 409, 411, 413, 415, 417, and 419. Although illustrated with a specific pattern for purpose of example, the eight data bits can be any combination of "ones" and "zeros". A typical character is then followed by one or more stop bits as illustrated by stop bits 421 and 423. The next data character can follow immediately as illustrated by start bit 425, or can be delayed by a variable length of time. As stated before, if there is any time delay between characters, the signal level will be maintained as a logical "one", the same as the stop bits 421 and 423.

The data signal in FIG. 5a has a data rate of 1200 Hz. In other words, the width of each data bit is approximately 0.833 milliseconds. The device described herein can be used with a variety of data rates; for example, submultiples of 1200 Hz (i.e., 600 Hz, 300 Hz, etc.).

The output of comparator 293 on lline 353 is clocked into the D-input of D-type flip-flop 309. The clocked input to flip-flop 309 is the 307.2 kHz output of binary counter 335 on line 355. Thus, the outputs of flip-flop 309 will be synchronized with the 307.2 kHz clock signal. The complementary output of flip-flop 309 on line 371 is illustrated in FIG. 5b. As illustrated, the complementary output is the inverse of the output of comparator 293. Although there can be a small delay between the D-input of flip-flop 309 on line 353 (FIG. 5a) and the complementary output of flip-flop 309 on line 371 (FIG. 5b), the delay is not illustrated in FIG. 5b since the 307.2 kHz clock rate on the clock input to flip-flop 309 on line 355 is 256 times the data rate, and therefore makes the delay insignificant compared to the data rate.

The complementary output of flip-flop 309 on line 371 is connected to capacitor 311. The other end of capacitor 311 is connected to resistor 313, the other end of which is connected to ground. Capacitor 311 and resistor 313 form a differentiating circuit which provides a narrow positive going pulse at the common node 367, as illustrated in FIG. 5c, as pulse 451. This positive going pulse on line 367 is input to the reset of binary counter 335. Thus, binary counter 335 will be reset at the leading edge of each start bit, and will therefore be resynchronized with the incoming data. The 1200 Hz output of the ninth stage of binary counter 335 is illustrated in FIG. 5d. Reset pulse 451 in FIG. 5c causes the 1200 Hz output of binary counter 335 on line 357 to be reset to a low level as shown at point 453 of FIG. 5d. Subsequent reset pulses 457, 459, 461, and 463 also reset binary counter 335. Thus, any minor differences between the frequency of the send data will be compensated for by synchronization of the 1200 Hz output of binary counter 335 on the occurrence of each "zero" data bit. (Although, there will be a negative going pulse on line 367 when line 367 returns to its low level, this negative going pulse is typically clamped by the input protection circuitry of the binary counter 335.)

The complementary output 371 of flip-flop 309 is the D-input of flip-flop 307. Flip-flop 307 is clocked by the 1200 Hz output of binary counter 335 on line 357. Thus, the first start bit will be clocked by the first positive going transition 455 (FIG. 5d) of the 1200 Hz clock, which transition occurs approximately in the middle of the start bit because of the resynchronization process described above. The true output and complementary output of flip-flop 307 on lines 363 and 365, respectively, are illustrated in FIGS. 5e and 5f, respectively.

The true and complementary outputs of flip-flop 307 on lines 363 and 365 are inputs to the waveform generator comprising NAND-gates 315, 317, 319, and 321 and resistors 341 and 343, potentiometer 347, and capacitor 345. The other input to NAND-gates 317 and 319 is the 1200 Hz clock output of binary counter 335 on line 357. When the true output of flip-flop 307 on line 363 is high and the complementary output on line 365 is low, the output of NAND-gate 321 will have the same level as the 1200 Hz clock on line 357. Conversely, if the true output on line 363 is low and the complementary output on line 365 is high, the output of NAND-gate 321 will have the opposite signal level as the clock signal on line 357. This is illustrated in FIG. 5g. When the input data signal (illustrated in FIG. 5a) is high prior to the occurrence of the first start bit, the true output on line 363 is low and the complementary output on line 365 is high. Therefore, the output of NAND-gate 321 is the inverse of the clock signal on line 357. This same result occurs for each data bit "one" in the data signal. During the start bit, and each subsequent data bit "zero", the output of NAND-gate 321 will be the same polarity as the clock signal on line 357.

The output of NAND-gate 321, as illustrated in FIG. 5g, and the 1200 Hz clock signal on line 357 are added through the resistor network comprising resistors 341 and 343 and potentiometer 347 to provide a signal on node 359 having four voltage levels. In the exemplary apparatus described herein, the resistance of resistor 341 is 5600 ohms, the resistance of resistor 343 is 12,000 ohms, and the resistance of the potentiometer 347 is 10,000 ohms.

When the 1200 Hz signal on line 357 and the output of NAND-gate 321 are both at a high level (i.e., approximately 6.2 volts), resistors 341 and 343 are effectively connected in parallel to 6.2 volts and potentiometer 347 provides a current path to ground. The effective voltage divider network thus results in approximately 4.48 volts on node 359.

When the line 357 and the output of NAND-gate 321 are both at a low level (i.e., approximately 0 volts), node 359 will be at approximately 0 volts since there is no high level signal at any point in the resistor network. Since line 357 and the output of NAND-gate 321 are at the same voltage level for logical "zero" input data, a logical "zero" input will result in a voltage swing on node 359 between 0 volts and approximately 4.48 volts. This voltage swing will thus be symmetrical around 2.24 volts.

When line 357 is at a high level (i.e., 6.2 volts) and the output of NAND-gate 321 is at a low level (i.e., 0 volts), resistor 343 and potentiometer 361 are effectively connected in parallel to 0 volts and form a voltage divider with resistor 341 which is effectively connected to 6.2 volts. The resulting voltage on node 359 will be approximately 3.06 volts.

When line 357 is at a low level (i.e., 0 volts) and the output of NAND-gate 321 is at a high level (i.e., 6.2 volts), resistor 341 and potentiometer 347 are effectively connected in parallel to 0 volts and form a voltage divider with resistor 342 which is effectively connected to 6.2 volts. The resulting voltage on node 359 will be approximately 1.42 volts. Since line 357 and the output of NAND-gate 321 are at the opposite voltage levels for logical "one" input data, a logical "one" input will result in a voltage swing on node 359 between 1.42 volts and approximately 3.06 volts. This voltage swing will thus be symmetrical around 2.24 volts, also.

As described above, the logical "zero" input data will typically cause a modulation signal on mode 359 that has a 4.48 volt swing which is symmetrical around 2.24 volts, while a logical "one" input will typically cause a modulation signal on node 359 that has a 1.64 volt swing that is also symmetrical about 2.24 volts. Thus, logical "zeroes" and logical "ones" can be distinguished by the magnitude of the modulation.

It is particularly advantageous to use this mode of modulation since the first large voltage swing in the modulation corresponds to the start bit of a data character. As will be set forth below, the larger swings in modulation result in corresponding larger frequency changes in the transmitted signal which can be detected by the receiving device.

Capacitor 345, connected to node 359 acts as a filter capacitor to slow the voltage transitions at the leading and trailing edges of each clock pulse. The modulation signal for the transmitter is taken from the wiper of potentiometer 347 on line 361. The potentiometer can be adjusted to reduce the level of modulation on the transmitter. The signal on line 361 will be proportional to the signal on node 359 as illustrated in FIG. 5h.

Figure 6:
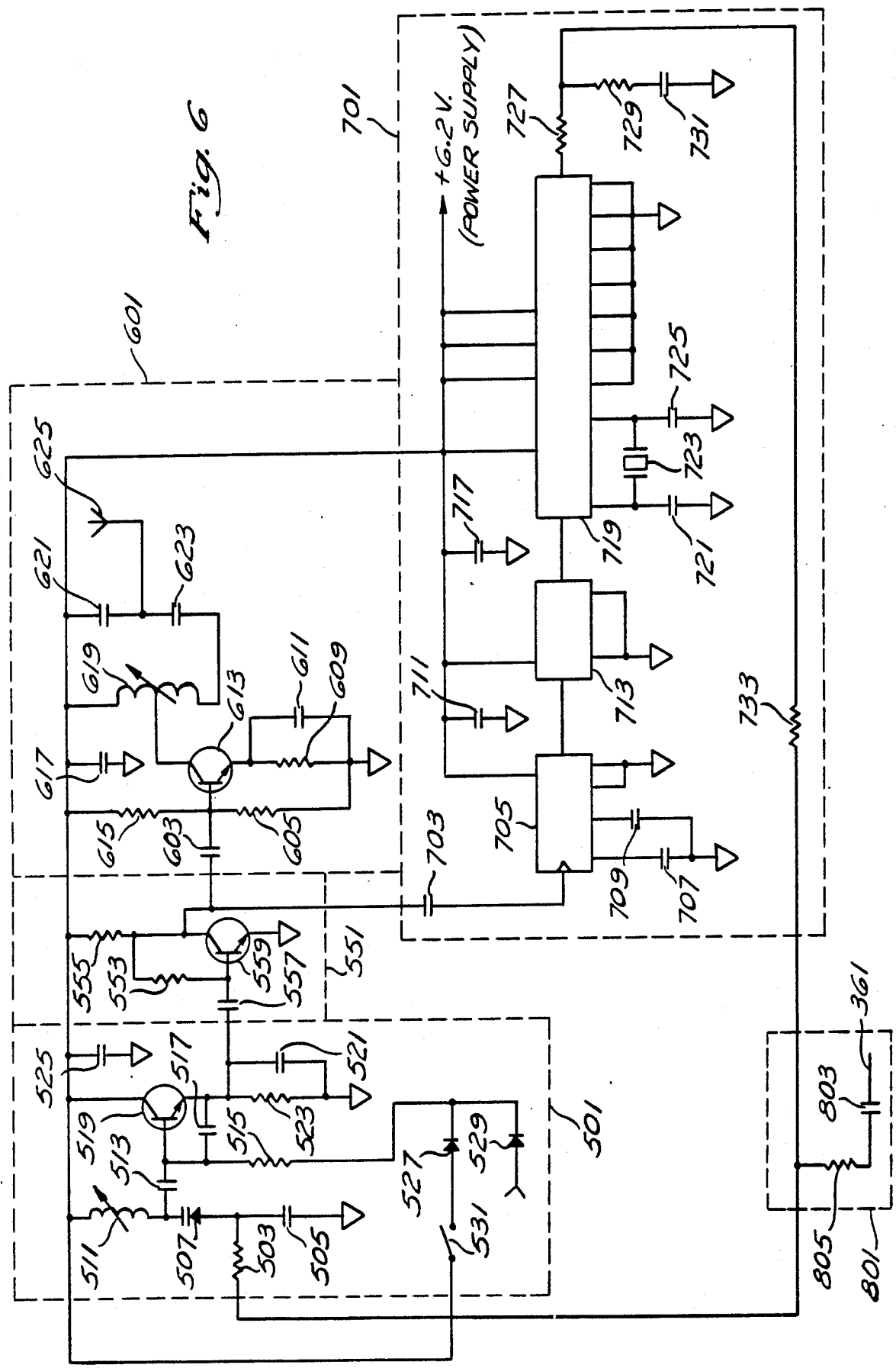
FIG. 6 is a schematic diagram of the transmitter circuit in the invention.

The transmitter circuit is illustrated in FIG. 6. The transmitter circuit comprises five basic blocks. Block 501 comprises a voltage controlled oscillator which is amplified by buffer amplifier 551. Buffer amplifier 551 is electrically connected to block 601 which is a tuned output amplifier which is connected to antenna 625. The output of buffer amplifier 551 is also electrically connected to frequency control circuit 701. Frequency control circuit 701 generates a direct current control voltage which controls the oscillation frequency of the voltage controlled oscillator 501. Block 801 is a modulation control circuit which is electrically connected to the DC control voltage and is also connected to the output of potentiometer 347, described in connection with FIG. 4 via line 361. Thus, as will be seen below, the frequency of oscillation of the voltage controlled oscillator 501 is determined by the output of frequency control circuit 701 and modulation circuit 801.

Voltage controlled oscillator 501 is comprised of resistor 503, capacitor 505, varactor diode (voltage-variable capacitance diode) 507, variable inductor 511, capacitor 513, resistor 515, capacitor 517, transistor 519, capacitor 521, resistor 523, and capacitor 525. Transistor 519 is a high frequency NPN transistor such as as MPSH10, manufactured by Motorola Semiconductor, or the like. The components are chosen such that the emitter output of transistor 519 will oscillate at a frequency of approximately 49.86 MHz when the control voltage is at a nominal level.

Diodes 527 and 529 are alternative voltage sources for the voltage controlled oscillator 501. The diodes are connected in parallel at their cathodes and are connected to resistor 515. If the voltage on the anode of either diode 527 or diode 529 is high (i.e., the power supply voltage), then the voltage controlled oscillator 501 will oscillate. Otherwise, the voltage controlled oscillator 501 will be quiescent. Voltage can be applied to diode 527 by engaging switch 531 which causes the carrier frequency to be transmitted continuously. In the alternative, voltage can be applied to diode 529 by activating the request-to-send line previously described in connection with FIG. 4. Thus, the voltage controlled oscillator 501 will only be activated when the request-to-send line is active and the digital device to which the apparatus is connected is ready to send data.

The control voltage is applied to the voltage controlled oscillator 501 through resistor 503 and varactor diode 507. Varactor diode 507 operates as a voltage controlled capacitor in the tuned circuit of voltage controlled oscillator 501. When the voltage across varactor diode 507 is a minimum, the capacitance is at the maximum value. When the voltage is a maximum, the capacitance is at its minimum value. The frequency of oscillation of voltage controlled oscillator 501 will increase as the capacitance of varactor diode 507 decreases, and vice versa. Thus, since varactor diode 507 is connected to the 6.2-volt power source through inductor 511, the capacitance of varactor diode 507 will be a maximum, and the frequency of oscillation a minimum, when the control voltage through resistor 503 is also at 6.2 volts. Similarly, the capacitance will be at its minimum, and the frequency at a minimum, when the control voltage through resistor 503 is at the ground reference level. In operation, the control voltage will vary a relatively small amount within the minimum and maximum levels and will tend to remain at an intermediate voltage level, and the frequency of oscillation will vary within + or −3000 Hz.

Capacitor 525 is a filter capacitor to reduce noise in the power supply voltage.

Buffer amplifier 551, comprising resistors 553 and 555, capacitor 557 and transistor 559, is provided to drive the loads presented by output amplifier 601 and voltage control circuit 701. Thus, the loads of output amplifier 601 and voltage control circuit 701 do not affect the operating frequency of the voltage controlled oscillator 501.

Output amplifier 601 is electrically connected to the output of the voltage controlled oscillator 501 through buffer amplifier 551. The high frequency output of voltage controlled oscillator 501, after amplification by buffer amplifier 551, is capacitively coupled through capacitor 603 to the base of transistor 613, which has a DC bias established by a voltage divider network comprising resistor 615 and resistor 605. Transistor 613, resistor 609 and capacitor 611 are connected as a common-emitter amplifier which amplifies the signal on the base of transistor 613 and applies it through the collector of 613 to antenna 625 through the tuning circuit comprising variable inductor 619 and capacitors 621 and 623. Antenna 625 is typically a telescoping, single element antenna with a length of less than one meter which is permanently affixed to the enclosure in which the transmitter is located.

Voltage control circuit 701 comprises capacitor 703, prescaler 705, capacitor 707, capacitor 709, capacitor 711, seven-bit binary counter 713, capacitor 717, phase lock loop synthesizer 719, crystal 723, capacitor 721, capacitor 725, resistor 727, resistor 729, capacitor 731 and resistor 733. Capacitors 711 and 717 are local power supply filter capacitors to reduce high frequency noise.

Prescaler 705 is basically a divide-by-sixteen counter which receives the high frequency output of voltage control oscillator 501, after amplification by buffer amplifier 551, through DC blocking capacitor 703. Capacitors 707 and 709 are bias decoupling capacitors. The output of prescaler 705 is 1/16 the frequency of the voltage controlled oscillator 501 (i.e., nominally 3.11625 MHz for a transmitted frequency of 49.860 MHz).

The output of prescaler 705 is applied to the input of seven-bit binary counter 713, which divides the exemplary 3.11625 MHz frequency by 128 to provide an output frequency of approximately 24,345.7 Hz.

Phase lock loop frequency synthesizer 719 is connected to the output of seven-bit binary counter 713 and is also connected to the crystal frequency source 723.

Crystal frequency source 723 and associated capacitors 721 and 725 provide a frequency of approximately 10.127812 MHz for a selected output frequency of the voltage controlled oscillator 501 of 49.860 MHz. The crystal frequencies for transmission frequencies of 49.830 MHz, 49.845 MHz, 49.875 MHz, and 49.890 MHz are 10.121718 MHz, 10.124765, 10.130859, and 10.133906, respectively. Phase lock loop synthesizer 719 divides the 10.127812 MHz signal by 416, internally, to obtain a reference signal which is approximately the same as the nominal frequency output of seven-bit binary counter 713. The frequency of the two signals are compared by a phase difference detector internal to synthesizer 719 to obtain an output signal which has a pulse width proportional to the difference in frequency and therefore proportional to resulting phase differences of the two signals. If the output of seven-bit binary counter 713 is higher than the internal reference frequency of phase lock loop synthesizer 719, the voltage output will be a high-level pulse (i.e., slightly less than the power supply voltage) with a width proportional to the frequency difference. Similarly, if the output frequency of seven-bit binary counter 713 is lower than the internal reference frequency of phase lock loop synthesizer 719, the voltage output of phase lock loop synthesizer 719 will be a low-level pulse (i.e., approximately zero volts) with a width proportional to the frequency difference. If the frequencies are the same (i.e., there is no detectable phase difference), the output of synthesizer 719 will be a tri-state level (i.e., the output of synthesizer 719 appears as an open circuit).

Resistor 727, resistor 729, and capacitor 731 comprise an integrating circuit electrically connected to the output of synthesizer 719. Capacitor 731 will be charged by high-level voltage pulses from synthesizer 719 and will be discharged by low level voltage pulses from synthesizer 719. Thus, if the output of the voltage controlled oscillator 501, after being divided, is higher than the internal frequency of the synthesizer 719, synthesizer 719 will generate a high-level pulse with a width proportional to the frequency difference. The voltage on capacitor 731 will be increased, thus increasing the voltage at node 735 between resistor 727 and resistor 729. Since this voltage is applied through resistor 733 and resistor 503 as the control voltage to voltage controlled oscillator 501, the capacitance of varactor 507 will be increased, as described above, and the frequency will be decreased. If the frequency decreases too much, the synthesizer 719 will generate zero voltage level pulses to discharge capacitor 731.

The levels and widths of the pulses out of synthesizer 719 will vary until the voltage on capacitor 731 is such that the frequency of voltage controlled oscillator 501 is correct. When the correct frequency is reached, synthesizer 719 exhibits a tri-state output (i.e., high impedance) and does not charge or discharge capacitor 731. Thus, the correct control voltage will tend to remain on node 735 as long as the output frequency of voltage controlled oscillator 501 remains substantially constant.

Modulator 801 is comprised of capacitor 803 and resistor 805. Capacitor 803 is connected to the variable voltage output from the wiper of potentiometer 347 (i.e., line 361), shown in FIG. 4. The transitions in the voltage output of potentiometer 347 on line 361, proportional to the signal on node 359 illustrated in FIG. 5h, are coupled through capacitor 803 and resistor 805 to the DC control voltage input to voltage controlled oscillator 501. The voltage controlled oscillator 501 responds to the voltage transitions by temporarily increasing or decreasing the frequency of the output signal. An increase in the DC control voltage decreases the frequency of oscillation and vice versa. Thus, the frequency will fluctuate as represented schematically in FIG. 5i.

Typically, resistor 805 is a 120,000 ohm resistor and capacitor 803 is a 0.1 microfarad capacitor. Thus, at 1200 kHz, the R-C time constant is large and the voltage on node 807 will track the voltage on node 361. Resistor 805 acts as a voltage divider circuit with resistors 733 and 729 to the reference voltage on capacitor 731. Thus, the voltage changes at node 361 from the waveform generator of FIG. 4 result in a reduced voltage swing at node 807. This voltage can be further reduced by adjusting the potentiometer 347. (FIG. 4)

Since capacitor 731 is large, the voltage control circuit 702 does not respond to the temporary changes in frequency caused by modulator 801. The modulation signal, as described in connection with FIG. 4 and FIG. 5h, is a symmetrical signal. Thus, each high level voltage signal is effectively offset by a corresponding low level voltage signal. Thus, there is less tendency to alter the control voltage in the form of the charge on capacitor 731 since each incremental charge from the modulation circuit 801 is followed by a corresponding incremental discharge. Furthermore, if the center frequency of the transmitter does drift up or down, the fluctuations in frequency caused by the data bits will still be detectable as changes from the nominal center frequency. Since both the "one" data bits and the "zero" data bits have both a frequency increase and a frequency decrease, they are detectable as dynamic changes in frequency rather than absolute changes in frequency from a fixed frequency, which may drift. The "one" data bits are detected as small frequency changes relative to the frequency changes corresponding to the "zero" data bits.

Typically, the high level modulation resulting from a logical "zero" causes the frequency to change + or −3000 Hz and the low level modulation resulting from a logical "one" causes the frequency to change + or −1500 Hz. These frequency changes are well within the 10,000 Hz bandwidth limitation imposed by the Federal Communications Commission.

A receiving device can detect the temporary fluctuations and reproduce the logic "one" data bits. The smaller fluctuations in the frequency output caused by transitions in the voltage output on potentiometer 347 can be detected by the receiving device as "one" data bits, and the larger fluctuations are detectable as "zero" data bits. Since the frequency changes at a 1200 Hz rate for both "ones" and "zeroes", the signal can be self clocking. The receiver can also detect the first large fluctuation in frequency as the start bit of the data character.

FIG. 7 is a partial cross sectional view of an exemplary mechanical construction of the device. Enclosure 901 is an enclosure for the interface adapter. Cable 903 connects the interface adapter to a data device. Typically, connector 251, shown in FIG. 3, will be attached to cable 903. Printed wiring board 905 contains the circuitry previously described in connection with FIG. 3. Infrared light emitting diode 907 corresponds to one of infrared light emitting diodes 263 and 271 of FIG. 3 and provides a modulated infrared light signal which is directed towards an opening 909 which is in substantial alignment with the direction of propagation of the light emitted by diode 907. A second light emitting diode (not shown) will typically be mounted in a similar manner. Typically, the light opening 909 will be one of the holes in connector shell 911 which is typically a "D" style connector shell ordinarily used with coaxial connector inserts.

The connector shell, illustrated in more detail in FIG. 8, is particularly suitable for this application since a substantially light-tight connection can be made with its mating connector 913. In their originally intended use, holes 915, 917, 919 and 921 and holes 923, 925, 927 and 929 of connectors 911 and 913, respectively, would have coaxial pins and sockets inserted in them. However, in the present invention, the holes are used to provide a light path between the interface adapter enclosure 901 and the transmitter enclosure 951, as illustrated in FIG. 7, and which correspond to optical paths 27a and 27b in FIGS. 3 and 4. As further illustrated in FIG. 7, connector shell 913 fits inside connector shell 911 to complete the light path. The enclosures 901 and 951 are light-tight to reduce any extraneous light. Any unused holes can be plugged, if necessary.

Infrared photodetector 953 is one of the photodetectors 291 and 301, previously described in connection with FIG. 4. It is mounted on printed wiring board 957 such that the light sensitive portion is aligned with the light path formed by the holes in connector 913. A second photodetector (not shown) will typically be mounted in a similar manner. Thus, when connector 913 is physically inserted into connector 911, an optical path is formed between the infrared light emitting diode 907 and the infrared photodetector 953. Although there is a mechanical connection between the interface adapter enclosure 901 and transmitter enclosure 951, there is no electrical connection. Connectors 911 and 913 can be plastic if necessary to comply with a requirement of no electrical connection.

Returning again to interface adapter enclosure 901, in a preferred embodiment, it further includes connector 921 which is a standard 25-socket EIA RS-232C connector. Typically, this connector will be used to provide an electrical connection between a receiver and the digital data device connected to cable 903. It corresponds to connector 253, shown schematically in connection with FIG. 3. It is equipped with standard sockets for electrical interconnection. However, the electrical interconnection is to a receiver and not to the electrically isolated transmitter.

The above-described device can be used in any application in which digital data is serially transmitted from a data source to a data destination. In a typical application, the data source is a digital computer which generates data to be printed on a printer remotely located from the computer. The apparatus is physically attached to the computer via the optical interconnection, and the digital data output of the computer is converted to a frequency modulated signal on one of the five frequencies described above. A conventional FM receiver can demodulate the received signal. The demodulated output of the receiver will be comprised of a 1200 Hz signal having two peak-to-peak amplitude levels substantially similar to the signal illustrated in FIG. 5h except that it will typically be sinusoidal. The 1200 Hz signal output can be detected as an active data signal to activate a decoder circuit connected to the output of the receiver. The decoder circuit can use the transitions of the 1200 Hz signal as a clock for sampling the amplitude levels in any number of methods known to one skilled in the art. One such method might be to rectify and filter the 1200 Hz signal to produce a two-level signal corresponding to the "ones" (low level) and "zeros" (high level) of the digital data. The levels can be sampled by conventional means at the 1200 Hz clock rate. Optionally, the printer can be equipped with a similar transmitter to send responsive signals or error codes back to the computer.

The described invention is particularly useful in the case where a number of computers share a common peripheral, such as a printer. Rather than having a cable to interconnect each of the computers with the printer, the invention can be easily moved from one computer to another to provide the data interconnection. Furthermore, each computer could be provided with its own interface adapter and transmitter and selectively transmit to the receiving device connected to the printer.

Similarly, the digital data source and a mobile robot could be interconnected utilizing the described apparatus. The robot could receive signals from the digital computer on one channel and transmit responsive information on an alternative channel.

Exemplary values for the above-described components in the invention which has been reduced to practice are as follows:

| | |
|---|---|
| 257 | 0.01 microfarad capacitor |
| 259 | 2200 ohm resistor |
| 261 | 1N4148 diode |
| 263 | MLED71 infrared light emitting diode |
| 265 | 0.01 microfarad capacitor |
| 267 | 2200 ohm resistor |
| 269 | 1N4148 diode |
| 271 | MLED71 infrared light emitting diode |
| 291 | MRD701 infrared photodetector |
| 293 | ¼ MC3303P operational amplifier |
| 295 | 12,000 ohm resistor |
| 297 | 820 ohm resistor |
| 299 | 2200 ohm resistor |
| 301 | MRD701 infrared photodetector |
| 303 | ¼ MC3303P operational amplifier |
| 305 | 2200 ohm resistor |
| 307 | ½ CD4013 CMOS D-type flip-flop |
| 309 | ½ CD4013 CMOS D-type flip-flop |
| 311 | 0.001 microfarad capacitor |
| 313 | 2200 ohm resistor |
| 315 | ¼ CD4011 CMOS NAND-gate |
| 317 | ¼ CD4011 CMOS NAND-gate |
| 319 | ¼ CD4011 CMOS NAND-gate |
| 321 | ¼ CD4011 CMOS NAND-gate |
| 323 | 0.001 microfarad capacitor |
| 325 | 614.4 kilohertz ceramic resonator (Murata Mfg., Part No. CSB614.4KHZ) |
| 327 | 220,000 ohm resistor |
| 329 | MPS6513 transistor |
| 331 | 0.001 microfarad capacitor |
| 333 | 2200 ohm resistor |
| 335 | CD4040 CMOS 12-bit binary counter |
| 341 | 5600 ohm resistor |
| 343 | 12,000 ohm resistor |
| 345 | 0.01 microfarad capacitor |
| 347 | 10,000 ohm potentiometer |
| 503 | 1000 ohm resistor |
| 505 | 0.01 microfarad capacitor |
| 507 | BB105B voltage-variable capacitance diode |
| 511 | 0.04 microhenry variable inductor |
| 513 | 4.7 picofarad capacitor |
| 515 | 47,000 ohm resistor |
| 517 | 47 picofarad capacitor |
| 519 | MPSH10 transistor |
| 521 | 47 picofarad capacitor |
| 523 | 470 ohm resistor |
| 525 | 0.1 microfarad capacitor |
| 527 | 1N4148 diode |
| 529 | 1N4148 diode |
| 553 | 47,000 ohm resistor |
| 555 | 1000 ohm resistor |

-continued

| | |
|---|---|
| 557 | 15 picofarad capacitor |
| 559 | MPSH10 transistor |
| 603 | 15 microfarad capacitor |
| 605 | 4700 ohm resistor |
| 609 | 100 ohm resistor |
| 611 | 0.01 microfarad capacitor |
| 613 | MPSH10 transistor |
| 615 | 33,000 ohm resistor |
| 617 | 0.01 microfarad capacitor |
| 619 | 0.04 microhenry variable inductor |
| 621 | 47 microfarad capacitor |
| 623 | 20 microfarad capacitor |
| 625 | antenna |
| 703 | 470 microfarad capacitor |
| 705 | MC3393P two modulus prescaler |
| 707 | 0.001 microfarad capacitor |
| 709 | 0.001 microfarad capacitor |
| 711 | 0.01 microfarad capacitor |
| 713 | CD4024 CMOS 7-bit binary counter |
| 717 | 0.01 microfarad capacitor |
| 719 | MC145143 phase lock loop frequency synthesizer |
| 721 | 47 microfarad capacitor |
| 723 | 10.127812 megahertz crystal |
| 725 | 56 microfarad capacitor |
| 727 | 2200 ohm resistor |
| 729 | 330 ohm resistor |
| 731 | 22 microfarad capacitor |
| 803 | 0.1 microfarad capacitor |
| 805 | 120,000 ohm resistor |

We claim:

1. An apparatus connectable to an electrical signal output of a source of digital data for transmitting said digital data on a frequency modulated radio signal, comprising:

an interface adapter electrically connectable to said electrical signal output which converts binary digital data on said electrical signal output having first and second electrical logic levels to an optical signal having a first light intensity corresponding to said first electrical logic level and having a second light intensity corresponding to said second electrical logic level; and a radio transmitter, optically connected to said interface adapter, which receives said optical signal and generates a frequency modulated signal in response to said optical signal, said frequency modulated signal generated at first and second frequencies when said optical signal has said first light intensity and generated at third and fourth frequencies when said optical signal has said second light intensity, said first and second frequencies symmetrical about a selected center frequency and said third and fourth frequencies symmetrical about said selected center frequency;

wherein said transmitter has no electrical connection to said interface adapter.

2. The apparatus as defined in claim 1 wherein said transmitter comprises:

a conversion circuit which receives said optical signal and generates a binary digital voltage signal responsive to said first and second light intensities of said optical signal;

a synchronization and waveform generation circuit electrically connected to receive said binary digital voltage signal from said conversion circuit, which generates a modulation output having first, second, third and fourth voltage levels responsive to said first and second light intensities of said optical signal; and a voltage controlled oscillator, electrically connected to said synchronization and waveform generation circuit, which generates an output signal at said selected center frequency, and which varies the frequency of said output signal responsive to said modulation output from the synchronization and waveform generation circuit, said output signal varying between said first and second frequencies when said modulation output is at said first and second voltage levels, respectively, and said output signal varying between said third and fourth frequencies when said modulation output is at said third and fourth voltage levels, respectively.

3. The apparatus as defined in claim 2 which further includes a voltage control circuit electrically connected to the output of said voltage controlled oscillator which voltage control circuit provides a control voltage to the input of said voltage controlled oscillator to control the frequency of said voltage controlled oscillator.

4. The apparatus as defined in claim 3 wherein the voltage control circuit compares the frequency of the voltage controlled oscillator with a reference frequency and adjusts the level of said control voltage to cause the frequency of said voltage controlled oscillator to remain substantially constant in the absence of modulation.

5. An apparatus for providing wireless communication of digital data in place of a standard electrical cable which ordinarily interconnects a source of digital electrical signals with a destination for said digital electrical signals, comprising:

an input connector which is electrically connectable to an output connector on said source where said standard electrical cable ordinarily is connected, said input connector thereby receiving digital electrical signals from said source, said digital electrical signals having at least first and second logic levels representative of said digital data;

an interface adapter, electrically connected to said input connector to receive said digital electrical signals, said interface adapter including means for converting said digital electrical signals to optical signals representative of said two logic levels of said digital electrical signals;

a transmitter, optically coupled to said interface adapter, to receive said optical signals and to generate a first pair of radio frequency signals comprising first and second frequencies responsive to said first optical intensity and to generate a second pair of radio frequency signals comprising third and fourth frequencies responsive to said second optical intensity, said first and second frequencies symmetrical about a center frequency, said third and fourth frequencies also symmetrical about said same center frequency;

a receiver to receive said radio frequency signals and to generate a reproduced digital electrical signal having first and second logic levels corresponding to said first and second logic levels of said digital electrical signals from said source; and a receiver output connector electrically connected to said receiver and electrically connectable to said destination so that said reproduced digital electrical signals are provided to said destination.

6. The apparatus as defined in claim 5 where said digital electrical signals comprise a serial stream of digital bits each having a substantially fixed time duration and wherein said transmitter transmits said first frequency and said second frequency for a first half and a second half, respectively, of the time duration of a data bit at said first logic level and transmits said third frequency and said fourth frequency for a first half and a second half, respectively, of the time duration of a data bit at said second logic level.

* * * * *